United States Patent [19]

McCracken

[11] Patent Number: 4,913,389
[45] Date of Patent: Apr. 3, 1990

[54] UNITARY TARGET STAND

[76] Inventor: Coy McCracken, 8301 Tieton Dr., Yakima, Wash. 98908

[21] Appl. No.: 361,413

[22] Filed: Jun. 5, 1989

[51] Int. Cl.⁴ .................................................. F41J 1/10
[52] U.S. Cl. ...................................... 248/156; 273/407
[58] Field of Search ............... 248/545, 156, 121, 175, 248/450, 530, 87, 158, 176, 316.1; 273/407, 408, 409; 40/606, 607; 24/570, 571

[56] References Cited

U.S. PATENT DOCUMENTS

| | | | |
|---|---|---|---|
| D. 190,330 | 5/1961 | Carothers | 248/530 |
| 1,515,418 | 11/1924 | Smith | 24/571 |
| 2,048,155 | 7/1936 | Armantrout | 124/15 |
| 2,372,111 | 3/1945 | Norberg | 273/102 |
| 2,538,118 | 1/1951 | Miller | 273/102 |
| 2,722,420 | 11/1955 | Adamson | 273/407 |
| 3,007,269 | 11/1961 | Jump | 248/158 |
| 3,080,166 | 3/1963 | Clark | 273/407 |
| 3,355,174 | 11/1967 | Hutson | 273/102 |
| 3,415,519 | 12/1968 | Hand | 273/102 |
| 3,460,282 | 8/1969 | Swirsky | 24/570 |
| 3,540,729 | 11/1970 | Rahberger | 273/407 |
| 3,601,353 | 8/1971 | Dale | 248/156 |
| 4,234,148 | 11/1980 | Maddestra | 248/174 |
| 4,323,251 | 4/1982 | Loveland et al. | 273/407 |
| 4,524,533 | 6/1985 | Still | 40/607 |
| 4,685,233 | 8/1987 | Hull | 40/607 |
| 4,726,593 | 2/1988 | Wade | 273/407 |
| 4,811,956 | 3/1989 | Foreman | 273/407 |

Primary Examiner—Ramon O. Ramirez
Assistant Examiner—Robert A. Olson
Attorney, Agent, or Firm—George A. Cashman

[57] ABSTRACT

A one-piece holder for shooting targets, archery targets, yard signs and the like has a first crossbar with a clip at each end having a toothed notch into which the target or sign suitable for the named purposes may be inserted. The first crossbar is supported by an upright which has a second crossbar at its lower end with earth-penetrating prongs extending downward therefrom, enabling the user to press the prongs into the ground with his foot, so as to support the holder and, therefore, the target or sign, vertically.

5 Claims, 1 Drawing Sheet

UNITARY TARGET STAND

BACKGROUND OF THE INVENTION

1. Field of the Invention

Those who practice informal outdoor pistol and rifle shooting often have difficulty finding a suitable target. Informal settings usually do not offer any sort of permanent target holders. Some shooters use glass bottles, cans, cardboard boxes, fenceposts, signs, and even trees as targets, resulting in unsightly litter and damaged property.

There is a need for a portable target stand which could be transported to the shooting site in the trunk of a car. The stand should be easy to set up, and it should not require assembly. It should be set into the ground easily to establish a safe, stable footing. The construction should be strong and durable for repeated use. The stand itself should present the minimum amount of target surface to the shooter, thus preventing damage to the stand from a misplaced or stray shot. At the present time, there is nothing readily available that meets these needs.

2. Description of the Related Art

U.S. Pat. No. 2,048,155 to Armantrout discloses a frame holding a continuous roll of targets which may be displayed and clamped in place by adjustable clamping means. The frame is held in place by its two legs being inserted in sockets which are hammered into the ground. The frame is collapsible for transport.

U.S. Pat. No. 2,372,111 to Norberg discloses a vertical post which may be screwed into a ground support, the ground support itself being suitable for disassembly. A collapsible target frame is slideable on the post, and may be retained by a clamp at any elevation. The target paper is tacked to the frame by thumb tacks or the like.

U.S. Pat. No. 2,538,118 to Miller discloses a pole which is slideable within a ground-penetrating tube, and which may be clamped at various heights. The pole itself is pointed and may be driven into the ground without using the tube. The pole supports a frame having collapsible vertical members, each of which supports a leaf spring at the midpoint of the spring. The target is clipped at its corners to the ends of the leaf springs.

U.S. Pat. No. 3,355,174 to Hutson discloses a channel-iron frame open at the top for insertion of a rigid target sheet of given size. Pointed support legs are screwed into the bottom of the frame. Means are provided for storing the legs on the frame when the stand is disassembled for transport.

U.S. Pat. No. 3,415,519 to Hand discloses a wooden frame having opposing slots in the vertical members to hold a rigid target of given size. The vertical members are held in position by a cross-member near the bottom, and a cross-member about halfway up the assembly. Hinged support legs are attached on opposite side of the upper cross-member at its median, for support from both front and back, and for adaptation to uneven ground.

U.S. Pat. No. 4,323,251 to Loveland et al. discloses a pointed pole, the upper end of which is adapted to receive and retain the two ends of a hoop. Spring clips are slidable around the hoop for retaining the edges or corners of a target of given size.

U.S. Pat. No. 4,524,533 to Still discloses a yard sign system for realtors comprising a pointed first post telescopically receiving a second post which may be secured to the first post at different heights. A third post is telescopically receivable within the second post. The second and third posts each have arms extending therefrom, the arms having sliding sleeves suitable for receiving the screws which retain the signs it is desired to display. The first post is forced into the ground before sign assembly with a special pounding tool.

U.S. Pat. No. 4,685,233 to Hull discloses a yard sign post comprising a square tube with a longitudinal slot in one side of the tube. The sign to be displayed must be folded along one vertical edge for retention within the slot. The sign must, of course, be rigid in order to stand out sideways. The lower end of the post is provided with a foot plate from which depends a sharpened stake for ground penetration. In a second embodiment the post is made in an L-shape, with the slotted side facing downward.

U.S. Pat. No. 4,811,956 to Foreman discloses a target stand which rests on the ground. A first embodiment discloses a segmented circular frame with which special clamps are used to hold the arcuate segments in proper relationship to each other, as well as to attach the support legs to the frame. A second embodiment discloses a segmented rectangular frame with the same kind of support arrangement. In either case, target paper is supported by hooks attached to the frame, the hooks cooperating with holes in the paper. A third embodiment discloses a folding target which may also be secured by hooks attached to the frame.

SUMMARY

This invention comprises an upright round steel rod, having a round steel crossbar welded across its lower end, the crossbar terminating at each end in downward-projecting prongs. A target bar is welded across the upper end of the upright. The target bar is a narrow strip of steel, each end of which is turned upwards and shaped in the form of a clip having a narrow, V-shaped opening with teeth formed within the "V" for retaining the target. To use the unitary target holder, it is only necessary to to place the prongs on the ground with the upright vertical, and step on the crossbar, thus forcing the prongs into the ground. The target is inserted into the clips by pulling or pushing it down into the V-shaped opening in each clip, until the target is between the teeth at the bottom of the V-shaped opening.

This invention fulfills the criteria mentioned above in "Field of the Invention". Its simple, one-piece construction requires no assembly whatever, and is easy to use. It can be carried easily in the trunk of a car. The two-pronged footing slips easily into the ground with a minimum of foot pressure. The clips hold the target firmly in place at a comfortable shooting height. The target holder itself presents a very slim profile to the shooter. The stand can be used on uneven ground by pistol and rifle shooters, as well as by archers. It is easily removed from the shooting site by simply pushing it to loosen, and then lifting it out of the ground. The use of this portable target stand would help eliminate the litter and property damage often found at informal outdoor shooting sites. The stand can also be used at home to display yard sale, garage sale, for rent and other signs. The addition of a free-standing base would permit the portable stand to be used for indoor signage.

As to the target or sign material inserted into the clips, it can be any of a wide variety of materials. It is necessary only that the material be reasonably stiff in one direction. For example, if a piece of corrugated cardboard is inserted into the clips with the corrugations more or less vertical, a satisfactory target is presented. The clips are also suitable for inserting and retaining heavy cardboard, linoleum or thin wood sheets such as veneer paneling, for example.

DESCRIPTION OF THE PREFERRED EMBODIMENT

Figure 1:
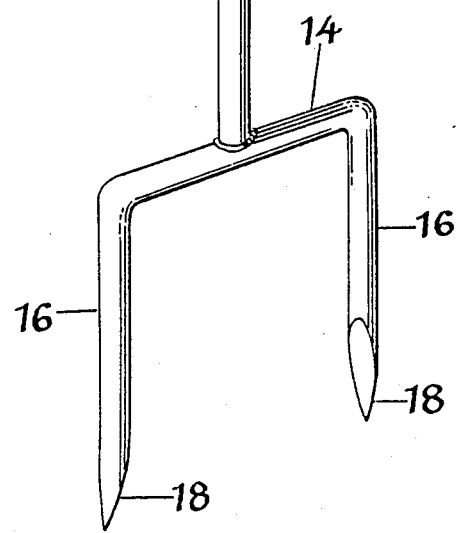
FIG. 1 is a perspective view of the portable target stand.

Referring first to FIG. 1, which shows the target holder 10 in perspective, upright 12, which is a metal rod, preferably steel, has crossbar 14 fixedly attached, preferably by welding, across its lower end. The longitudinal axis of crossbar 14 is perpendicular to the longitudinal axis of upright 12. Crossbar 14 is attached to upright 12 at the midpoint of crossbar 14. Crossbar 14 is also a metal rod, preferably steel, and terminates at each end in downward-projecting prongs 16, each of which comes to a point 18 at the free end. Prongs 16 are oriented parallel to the longitudinal axis of upright 12.

Target bar 20, manufactured of a narrow strip of metal, preferably steel, is fixedly attached, preferably by welding, across the upper end of upright 12 at the midpoint of target bar 20.

Target bar 20 is parallel to the longitudinal axis of crossbar 14. As can be seen in FIG. 1, the wide side of strip 22 forming target bar 20 is attached to upright 12, thus presenting narrow edge 24 to the shooter. Each end 26 of target bar 20 is bent upwards to form a clip 28, each clip 28 being approximately perpendicular to narrow edge 24.

Figure 2:
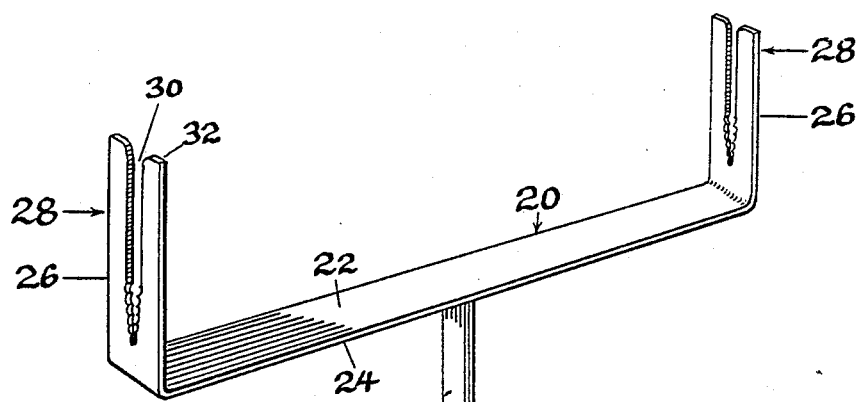
FIG. 2 is an elevational view of the target holding clip, to somewhat larger scale than that of FIG. 1.
Figure 2:
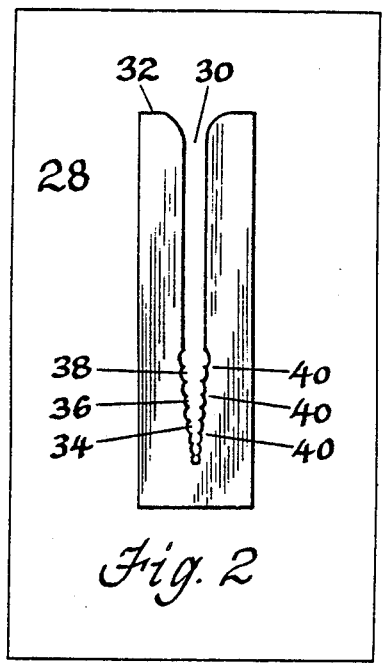

As illustrated in FIG. 2, a V-shaped notch 30 extends downward from end 32 of clip 28. In forming notch 30, a series of spaced-apart holes 34, 36 and 38 for example, of increasing diameter (counting upward) is provided, so that when the metal is removed to form notch 30, teeth 40 are formed, each opposite pair of teeth being further apart as counted from the bottom of notch 30. It can be seen that comparatively rigid planar targets of various thicknesses can be inserted downwards into notches 30 and between opposite pairs of teeth 40, and retained therein in a vertical position, when prongs 16 are inserted more or less vertically into the ground.

It is recognized that teeth 40 could also be formed in a V-shape similar to saw teeth, but it is believed that, in this preferred embodiment, greater holding power is obtained by the teeth 40 formed within notch 30 by the method described above.

While this invention is susceptible of embodiment in different forms, the drawings and the specification illustrate the preferred embodiment of the invention, with the understanding that the present disclosure is to be considered an exemplification of the principles of the invention, and the disclosure is not intended to limit the invention to the particular embodiment described.

I claim:

1. A one-piece device for holding shooting and archery targets, yard signs and the like comprising:
   (a) an upright member;
   (b) a ground-penetrating supporting means rigidly attached to the lower end of the upright member;
   (c) a metal strip laid flat across the upper end of the upright member and rigidly affixed thereto; and
   (d) a plurality of clips rigidly affixed to the strip and extending perpendicularly from the strip in a direction approximately parallel to the upright member and in the opposite direction therefrom, each clip comprising a metal strip having a serrated V-shaped notch extending inwardly from the free end of the clip, the notches in the clips being aligned with each other.

2. The device of claim 1 wherein the number of clips is two, and the number of pointed members is two.

3. The device of claim 1 wherein the number of clips is two.

4. A one-piece device for holding shooting and archery targets, yard signs and the like comprising:
   (a) an upright member;
   (b) a crossbar rigidly affixed perpendicularly to the lower end of the upright member;
   (c) a plurality of pointed members rigidly affixed to the crossbar and extending approximately perpendicularly from the crossbar in a direction approximately parallel to the upright member and in the opposite direction therefrom;
   (d) a metal strip laid flat across the upper end of the upright member and rigidly affixed thereto; and
   (e) a plurality of clips rigidly affixed to the strip and extending perpendicularly from the strip in a direction approximately parallel to the upright member and in the opposite direction therefrom, each clip comprising a metal strip having a serrated, V-shaped notch extending inwardly from the free end of the clip, the notches in the clips being aligned with each other.

5. The device of claim 4 wherein the number of pointed members is two.

* * * * *